Patented Oct. 28, 1952

2,615,877

UNITED STATES PATENT OFFICE 2,615,877

COPOLYMERS OF VINYLIDENE CYANIDE WITH 2-MONO-HALOGENATED MONO-OLEFINS

Vernon L. Folt, Akron, Ohio, assignor to The B. F. Goodrich Company, New York, N. Y., a corporation of New York No Drawing. Application August 25, 1950, Serial No. 181,588

10 Claims. (Cl. 260—78.5)

This invention relates to the preparation of novel copolymers of vinylidene cyanide with certain halogenated monoolefins, particularly 2-chloropropene, which copolymers are extremely useful in the preparation of filaments and films.

In U. S. Patents 2,476,270 and 2,502,412 to Alan E. Ardis, and 2,514,387 to Harry Gilbert, novel methods for the preparation of monomeric vinylidene cyanide are disclosed. In a copending application, Serial No. 11,336, filed February 26, 1948, methods for preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with halogenated monoolefins in the presence of a free radical catalyst to give new and highly useful copolymers. It has also been discovered that when the polymerization is carried out in such manner that the total monomer charge contains from 1 to 50 mole per cent of monomeric vinylidene cyanide, the copolymers obtained are even further unique in that they are essentially 1:1 alternating copolymers, that is, copolymers possessing the structure:

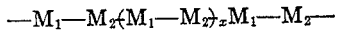

wherein each $M_1$ is a vinylidene cyanide unit

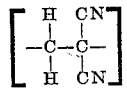

each $M_2$ is a unit of a 2-halogenated monoolefin and $x$ is any number, preferably from 150 to 12,000.

When 1 to 50 mole per cent vinylidene cyanide is present in the monomer charge, analysis of the resulting copolymer reveals that it contains essentially 50 mole per cent of vinylidene cyanide, that is one unit of vinylidene cyanide enters the copolymer structure for each unit of the halogenated monoolefin. The composition of the copolymers may be described by the following copolymerization equation of F. Lewis, C. Walling, W. Cummings, E. Briggs, and F. Mayo, Journal of the American Chemical Society 70, 1519 (1948):

$$\frac{d(M_1)}{d(M_2)} = \frac{(M_1)}{(M_2)} \cdot \frac{r_2(M_1)+(M_2)}{r_2(M_2)+(M_1)}$$

wherein ($M_1$) = concentration of unreacted monomer $M_1$
($M_2$) = concentration of unreacted monomer $M_2$
$r_1$ = ratio of the rate constants for the reaction of an $M_1$ radical with $M_1$ and $M_2$ respectively
$r_2$ = ratio of the rate constants for the reaction of an $M_2$ radical with $M_2$ and $M_1$ respectively When the units alternate the values of $r_1$ and $r_2$ are small and the product of $r_1$ and $r_2$ (the values of $r_1$ and $r_2$ being determined by solving the equation above for $r_1$ and $r_2$ respectively) is equivalent to 0. It has been found that the values of $r_1$ and $r_2$ as calculated for the vinylidene cyanide:2-halogenated monoolefin copolymer system are small and the product is substantially zero, indicating that an essentially 1:1 alternating copolymer is formed.

It is highly surprising that vinylidene cyanide will polymerize so readily with 2-halogenated monoolefins, which are ordinarily very difficult to polymerize by themselves, since most polymerizable materials form useful copolymers only with other monomers which can be polymerized readily by themselves.

The 2-halogenated monoolefins which are polymerized with vinylidene cyanide in accordance with this invention possess the structure

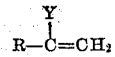

wherein R is a lower alkyl radical such as methyl, ethyl, propyl, or butyl, and Y is a halogen atom such as chlorine, fluorine, bromine, or iodine. Because of its low cost and the fact that it may be readily obtained in commercial quantities, 2-chloropropene is a preferred monomer for use in the polymerization with vinylidene cyanide. However, other monomers of the above general class, including 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 2-iodoheptene, and the like may likewise be polymerized with vinylidene cyanide.

The polymerization itself may be carried out in several different ways. For example, one preferred method consists simply in heating a mixture of the monomers and polymerization catalyst, without the use of a solvent or other liquid medium for the monomers, to effect the polymerization. The polymerization occurs readily at temperatures of about 20° C. to 100° C., the copolymer forming generally as a white resinous powder of small particle size.

A second method of polymerization consists in first dissolving the vinylidene cyanide and the 2-halogenated monoolefin in benzene or other liquid aromatic solvents such as toluene, methyl toluene, trichlorobenzene, or the like, preferably free from impurities which initiate the ionic polymerization of the monomer and in an amount such that the solvent comprises approximately 30 to 80% by weight of the total solution. A poly-

Examples I to VIII

A series of eight vinylidene cyanide-2-chloropropene copolymers is prepared by admixing varying amounts of both monomers with 0.15% (based on the total weight of the two monomers) of o,o'-dichlorobenzoyl peroxide and maintaining the resulting mixtures at a temperature of 40° C. for from 105 to 265 minutes. The copolymer obtained at the end of this period is then analyzed to determine its composition. The vinylidene cyanide charging ratio, the time during which the polymerization is carried out, the per cent nitrogen in the copolymer and the mole per cent of vinylidene cyanide in the copolymer are recorded in the following table:

|  | Ex. I | Ex. II | Ex. III | Ex. IV | Ex. V | Ex. VI | Ex. VII | Ex. VIII |
|---|---|---|---|---|---|---|---|---|
| Mole percent vinylidene cyanide in charge | 1.963 | 4.910 | 9.829 | 14.758 | 24.644 | 49.524 | 72.641 | 89.835 |
| Polymerization time (minutes) | 165 | 105 | 105 | 105 | 105 | 105 | 265 | 265 |
| Percent nitrogen in copolymer | 17.78 | 18.20 | 18.39 | 18.43 | 17.96 | 19.50 | 23.64 | 27.74 |
| Mole percent vinylidene cyanide in copolymer | 49.017 | 50.13 | 50.68 | 50.78 | 49.46 | 53.20 | 65.42 | 76.87 | merization catalyst is included in this solution and the resulting mixture is maintained at the desired temperature whereupon polymerization occurs to form the desired copolymer. The copolymer thus formed may be separated from the polymerization medium simply by filtering, or if desired the solvent may be removed by evaporation. Also, the polymerization may be effected at temperatures as low as 0° C. or lower or as high as 100° C. or even higher provided a catalyst is utilized which will dissociate into free radicals at the polymerization temperature.

It is to be understood, of course, that regardless of the polymerization method utilized, the polymerization should be stopped before either of the monomers is entirely consumed, in order that true copolymer will be obtained. Otherwise, when either of the monomers is completely used up, the product will contain straight polymer obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like. In general, from 0.01 to 2.0% by weight of the catalyst based on the weight of the monomers is utilized although smaller or larger amounts may be utilized if desired.

The following examples illustrate the preparation of copolymers of vinylidene cyanide and 2-halogenated monoolefins in accordance with this invention, but are not to be construed as a limitation upon the scope thereof, for there are, of course, numerous possible variations and modifications. In the examples all parts are by weight.

When other 2-halogenated monoolefins selected from those disclosed hereinabove are substituted for 2-chloropropene in the above examples, the copolymers obtained possess properties generally equivalent to the vinylidene cyanide:2-chloropropene copolymer. Likewise, when the polymerization is carried out according to the other methods described hereinabove or utilizing other of the peroxygen catalysts disclosed, excellent results are achieved.

The copolymers which are prepared according to this invention are characterized by a high degree of alkaline insensitivity and by being soluble in dimethyl formamide. The essentially 1:1 alternating copolymers of this invention are further characterized by possessing softening points of from about 140 to 150° C. This latter property renders the copolymers quite useful in the preparation of molded objects and they may also be melt spun or cast into excellent films. Moreover, as disclosed hereinabove, the copolymers are useful in the preparation of solutions from which can be spun filaments of any desired size having high tensile strength, excellent resistance to the action of alkalis and acids as well as many other advantageous properties.

Although specific examples of the invention have been herein described, it is not intended to limit the invention solely thereto, but to include all of the variations and modifications falling within the spirit and scope of the appended claims.

I claim:

1. A copolymer of vinylidene cyanide and a compound of the structure

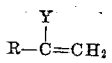

wherein R is a lower alkyl radical and Y is a halogen atom, the monomeric vinylidene cyanide entering into said copolymer to produce the vinylidene cyanide units therein being a liquid at room temperature and a crystalline solid at 0° C. having a melting point when in purest form of substantially 9.0° C. to 9.7° C. and being characterized chemically by the ability to undergo on contact with water at room temperature an instantaneous homopolymerization reaction to give a solid, water-insoluble resin.

2. The copolymer of claim 1 wherein the compound of the structure

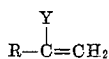

is 2-chloropropene.

3. A copolymer of vinylidene cyanide and a 2-halogenated monoolefin of the structure

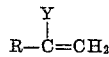

wherein R is a lower alkyl radical and Y is a halogen atom, said copolymer possessing essentially the structure

wherein each $M_1$ is a vinylidene cyanide unit of the structure

each $M_2$ is a unit of said 2-halogenated monoolefin of the structure

and $x$ is a number, the vinylidene cyanide units in said copolymer being derived from monomeric vinylidene cyanide which is a liquid at room temperature and a crystalline solid at 0° C. having a melting point when in purest form of substantially 9.0° C. to 9.7° C., and being characterized chemically by the ability to undergo on contact with water at room temperature an instantaneous homopolymerization reaction to give a solid, water-insoluble resin.

4. The copolymer of claim 3 wherein the 2-halogenated monoolefin is 2-chloropropene.

5. The method which comprises admixing monomeric vinylidene cyanide, said monomeric vinylidene cyanide being a liquid at room temperature and a crystalline solid at 0° C. having a melting point when in purest form of substantially 9.0° C. to 9.7° C., and being characterized chemically by the ability to undergo on contact with water at room temperature an instantaneous homopolymerization reaction to give a solid, water-insoluble resin, with a 2-halogenated monoolefin of the structure

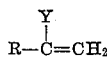

wherein R is a lower alkyl radical and Y is a halogen atom, and with a peroxygen catalyst, and maintaining the resulting mixture at a temperature of about 20° C. to 100° C. for a time sufficient to effect copolymerization of the said vinylidene cyanide and 2-halogenated monoolefin and formation of a solid, resinous copolymer of vinylidene cyanide and the 2-halogenated monoolefin.

6. The method of claim 5 characterized in that the compound of the structure

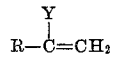

is 2-chloropropene.

7. The method of claim 6 further characterized in that the peroxygen catalyst is o,o'-dichlorobenzoyl peroxide.

8. The method which comprises admixing monomeric vinylidene cyanide, said monomeric vinylidene cyanide being a liquid at room temperature and a crystalline solid at 0° C. having a melting point when in purest form of substantially 9.0° C. to 9.7° C., and being characterized chemically by the ability to undergo on contact with water at room temperature an instantaneous homopolymerization reaction to give a solid, water-insoluble resin, with a 2-halogenated monoolefin of the structure

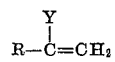

wherein R is a lower alkyl radical and Y is a halogen atom, in an amount such that the mixture contains from 1 to 50 mole per cent monomeric vinylidene cyanide, adding a peroxygen catalyst, and maintaining the resulting mixture at a temperature of about 20° C. to 100° C. for a time sufficient to effect copolymerization of the said vinylidene cyanide and 2-halogenated monoolefin and formation of a solid, resinous copolymer of the structure

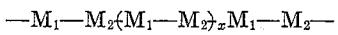

wherein each $M_1$ is a vinylidene cyanide unit of the structure

each $M_2$ is a unit of said 2-halogenated monoolefin of the structure

and $x$ is a number.

9. The method of claim 8 further characterized in that the compound of the structure

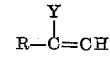

is 2-chloropropene.

10. The method of claim 9 further characterized in that the peroxygen catalyst is o,o'-dichlorobenzoyl peroxide.

VERNON L. FOLT.

REFERENCES CITED

The following references are of record in the file of this patent:

UNITED STATES PATENTS

| Number | Name | Date |
|---|---|---|
| 2,466,395 | Dickey | Apr. 5, 1949 |